United States Patent
König et al.

(10) Patent No.: US 12,553,418 B2
(45) Date of Patent: Feb. 17, 2026

(54) RELIABLE PITCH TUBE FOR A BLADE PITCH CONTROL SYSTEM OF A WIND TURBINE

(71) Applicant: Flender GmbH, Bocholt (DE)

(72) Inventors: Christian König, Bocholt (DE); Lars Van Acken, Bocholt (DE)

(73) Assignee: Flender GmbH, Bocholt (DE)

( * ) Notice: Subject to any disclaimer, the term of this patent is extended or adjusted under 35 U.S.C. 154(b) by 0 days.

(21) Appl. No.: 19/116,240

(22) PCT Filed: Sep. 5, 2023

(86) PCT No.: PCT/EP2023/074220
§ 371 (c)(1),
(2) Date: Mar. 27, 2025

(87) PCT Pub. No.: WO2024/068191
PCT Pub. Date: Apr. 4, 2024

(65) Prior Publication Data
US 2026/0002520 A1 Jan. 1, 2026

(30) Foreign Application Priority Data

Sep. 28, 2022 (EP) ..................... 22198241

(51) Int. Cl.
*F03D 80/70* (2016.01)
*F03D 15/10* (2016.01)
*F03D 80/80* (2016.01)

(52) U.S. Cl.
CPC ......... *F03D 80/701* (2023.08); *F03D 15/101* (2023.08); *F03D 80/85* (2016.05);
(Continued)

(58) Field of Classification Search
CPC .......... F03D 80/00; F03D 80/80; F03D 80/70; F03D 80/88; F03D 80/85; F03D 80/701;
(Continued)

(56) References Cited

U.S. PATENT DOCUMENTS 10,935,004 B2 * 3/2021 Fischer .................. F03D 80/85
12,123,405 B2 * 10/2024 De Laet ................ F16H 57/029
(Continued)

FOREIGN PATENT DOCUMENTS

| CN | 102032113 A | 4/2011 |
| CN | 107605660 A | 1/2018 |

(Continued)

OTHER PUBLICATIONS

International Search Report issued by the European Patent Office on Oct. 31, 2024 in International Application PCT/EP2023/074220.
(Continued)

*Primary Examiner* — Nathaniel E Wiehe
*Assistant Examiner* — Joshua R Beebe
(74) *Attorney, Agent, or Firm* — Henry M. Feiereisen LLC

(57) ABSTRACT

A pitch tube for a blade pitch control system of a wind turbine includes a tube body extending from a first axial end to a second axial end, for passing supply lines through a transmission. The tube body is designed in multiple parts and made of a non-conductive material only in an axial partial region in order to electrically insulate the first axial end in relation to the second axial end and/or in order to electrically insulate the tube body in relation to the transmission.

19 Claims, 3 Drawing Sheets

(52) U.S. Cl.
CPC ....... *F05B 2260/30* (2013.01); *F05B 2260/84* (2013.01); *F05B 2280/50* (2013.01)

(58) Field of Classification Search
CPC ................ F03D 15/101; F05B 2260/30; F05B 2260/84; F05B 2280/50
See application file for complete search history.

(56) References Cited

U.S. PATENT DOCUMENTS

| | | | | |
|---|---|---|---|---|
| 12,276,255 | B2 * | 4/2025 | Strasser | .................. F03D 15/00 |
| 2010/0329867 | A1 * | 12/2010 | Patel | ...................... F03D 15/00 |
| | | | | 416/169 R |
| 2013/0130862 | A1 * | 5/2013 | Sprenger | ................... F16H 1/46 |
| | | | | 475/331 |
| 2013/0165288 | A1 * | 6/2013 | Dinter | ..................... F03D 80/70 |
| | | | | 475/149 |
| 2022/0333580 | A1 | 10/2022 | De Laet et al. | |

FOREIGN PATENT DOCUMENTS

| | | | |
|---|---|---|---|
| DE | 102016202735 | A1 | 8/2017 |
| EP | 3094861 | B1 | 11/2019 |
| EP | 3795825 | A1 | 3/2021 |
| EP | 3795862 | A1 | 3/2021 |

OTHER PUBLICATIONS

Chinese Search Report issued by the Chinese Patent Office on Jul. 10, 2025 in Chinese Patent Application No. 202380069784.0.
Translation of Chinese Search Report issued by the Chinese Patent Office on Jul. 10, 2025 in Chinese Patent Application No. 202380069784.0.

* cited by examiner

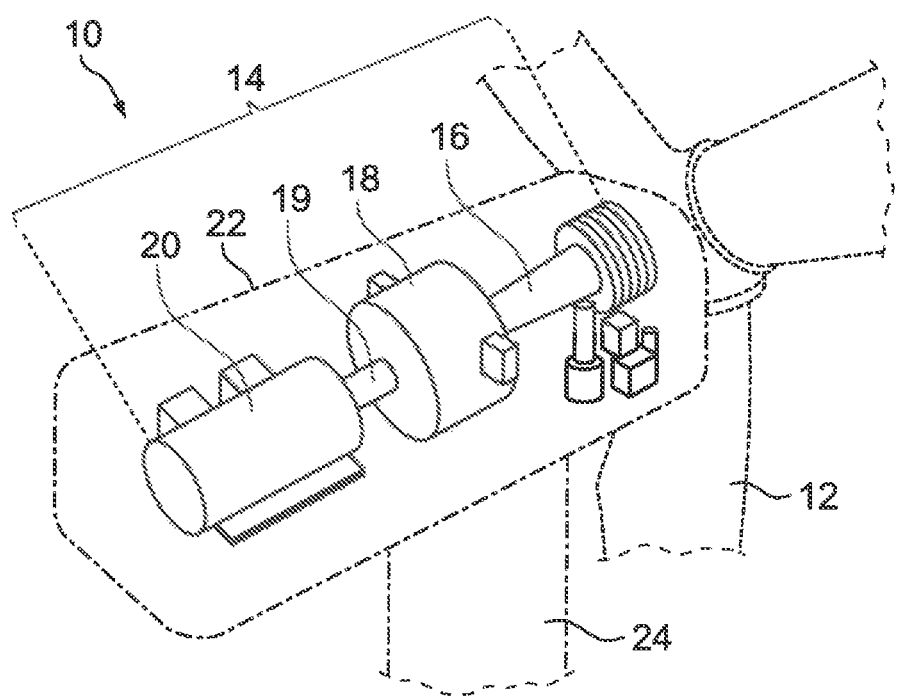
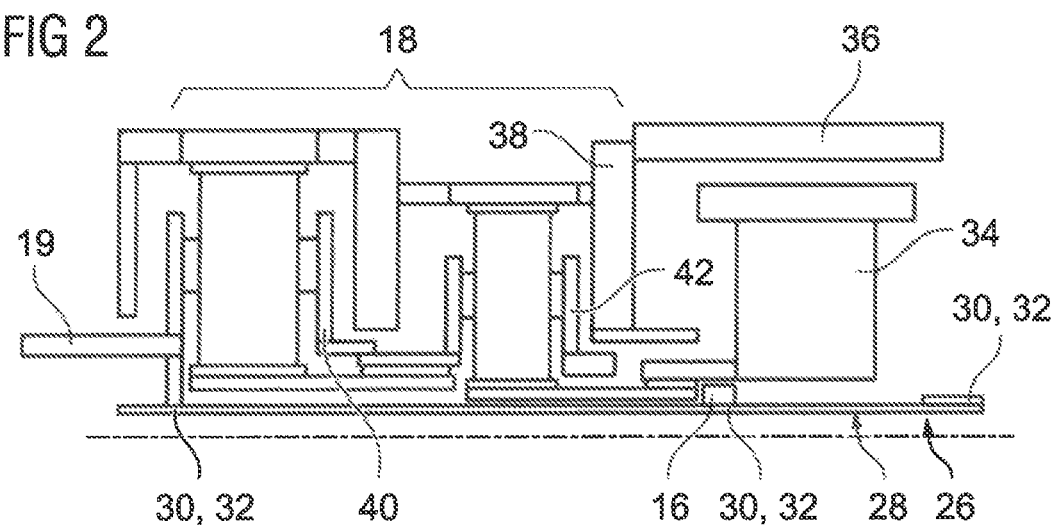

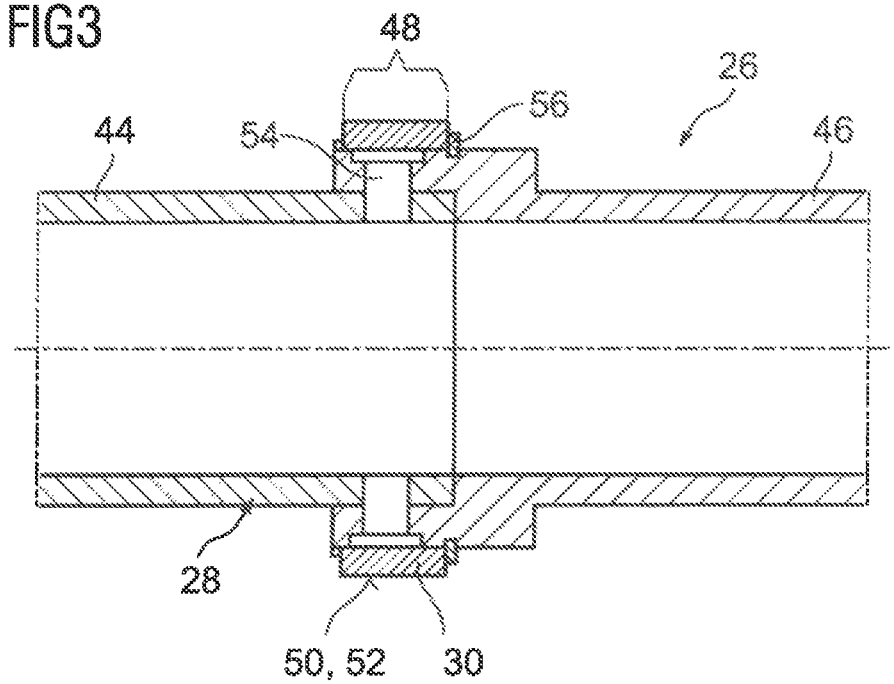
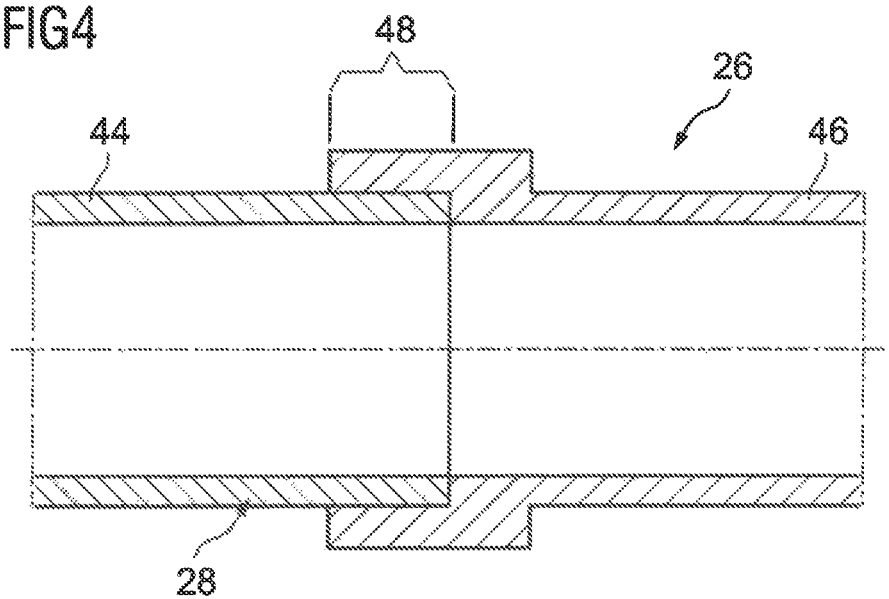

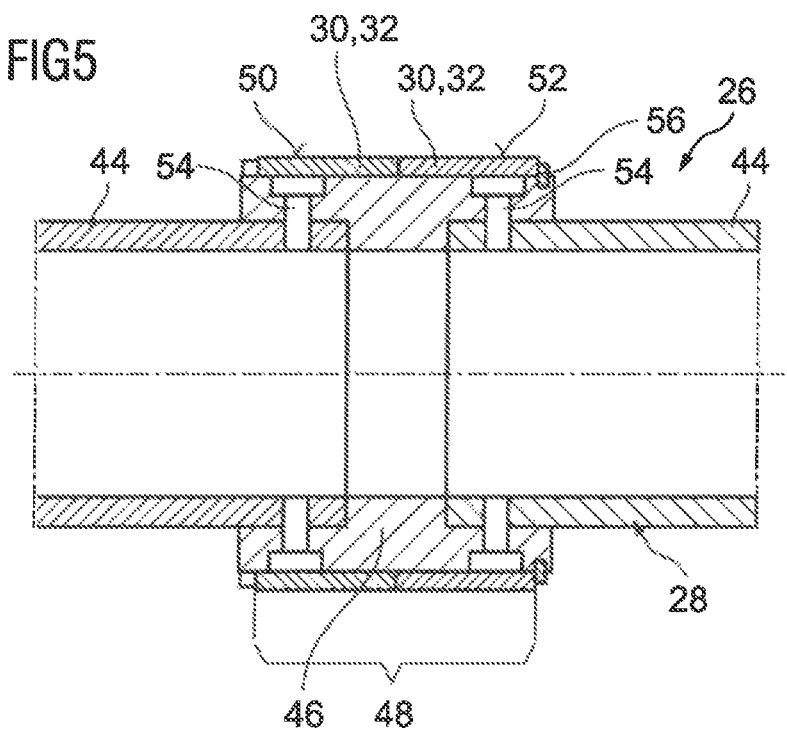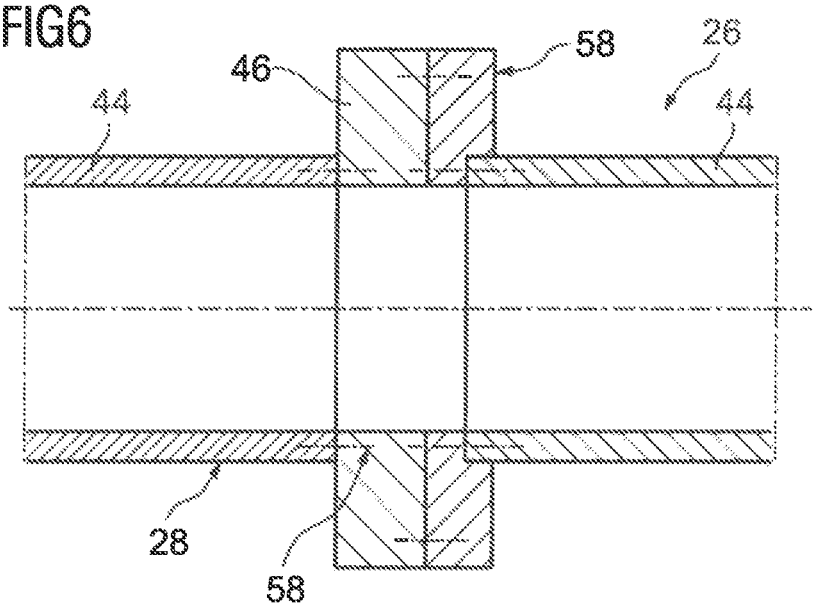

RELIABLE PITCH TUBE FOR A BLADE PITCH CONTROL SYSTEM OF A WIND TURBINE

CROSS-REFERENCES TO RELATED APPLICATIONS

This application is the U.S. National Stage of International Application No. PCT/EP2023/074220, filed Sep. 5, 2023, which designated the United States and has been published as International Publication No. WO 2024/068191 A1 and which claims the priority of European Patent Application, Serial No. 22198241.6, filed Sep. 28, 2022, pursuant to 35 U.S.C. 119(a)-(d).

BACKGROUND OF THE INVENTION

The invention relates to a pitch tube which can be used to bring supply lines to a blade pitch control system of a wind turbine. The invention also relates to a transmission having such a pitch tube, to a drive train having such a pitch tube, to a wind turbine having such a pitch tube, and to a data agglomerate for the virtual representation of such a pitch tube for the purpose of additive manufacturing and/or simulation.

In order to be able to undertake blade pitch control in wind turbines, electrical and/or hydraulic supply lines that run between the rotor and a generator-side connection are required. A tube which is referred to as a pitch tube and can extend from a generator to the rotor is used to accommodate these supply lines. In particular, the rotor and the generator are arranged coaxially to each other, so that the pitch tube is passed through a transmission, which is connected between the rotor and the generator, over the entire axial extent of the transmission, in particular coaxially to the transmission.

It is known from EP 3 795 825 A1 to fix a pitch tube via a fixing means made from an electrical insulator to a planet carrier of a planetary transmission of a wind turbine, the fixing means being fastened both to the pitch tube and to the planet carrier.

It is known from EP 3 795 862 A1 to fix a pitch tube with the aid of a fixing means in a transmission of a wind turbine, with an electrically insulating insulation layer being provided between the fixing means and the pitch tube.

It is known from EP 3 094 861 B1 to produce a pitch tube of a wind turbine from a plastic.

It is known from DE 10 2016 202 735 A1 to design a pitch tube of a wind turbine to be dividable, in order to simplify the installation of the pitch tube.

There is a constant need to make the passage of a pitch tube through a transmission of a wind turbine as operationally reliable and cost-effective as possible.

It is the object of the invention to specify measures that enable a more operationally reliable and cost-effective passage of a pitch tube through a transmission of a wind turbine.

SUMMARY OF THE INVENTION

The object is achieved by means of a pitch tube as set forth hereinafter, a transmission as set forth hereinafter, and a data agglomerate, as set forth hereinafter. Preferred refinements are specified in the dependent claims and the description below and can each represent an aspect of the invention individually or in combination. If a feature is presented in combination with another feature, this serves only for simplified presentation of the invention and is in no way intended to mean that this feature cannot also be a refinement of the invention without the other feature.

One aspect of the invention relates to a pitch tube for a blade pitch control system of a wind turbine, having a tube body extending from a first axial end to a second axial end, for passing supply lines through a transmission, wherein the tube body is configured in multiple parts, wherein the tube body is made of a non-conductive material only in an axial partial region in order to electrically insulate the first axial end in relation to the second axial end and/or in order to electrically insulate the tube body in relation to the transmission.

By means of the non-conductive material of the tube body that acts as an electrical insulator, a sufficiently effective dielectric is provided such that, even at the narrowest point between electrically conductive components of the tube body and/or between the tube body and the transmission, a voltage flashover during regular operation of the wind turbine can be safely avoided. The currents and/or stray or leakage currents of the generator induced in the pitch tube by the generator can at most reach an area before the partial region produced from the non-conductive material. The positioning of the non-conductive material within the tube body can therefore enable a region affected by electrical voltages and/or electrical currents outside and/or within the tube body to be kept to a region where a voltage flashover into a transmission component of the transmission can be safely avoided. Damage and/or impairment of transmission components by voltage flashovers promoted by the pitch tube can thus be avoided or at least reduced.

Since it is the pitch tube itself that brings about electrical insulation, electrical insulation measures on transmission components and/or on connecting elements that produce a rigid or relatively movable connection between the pitch tube and the transmission can be avoided. In particular, it is possible to provide the electrical insulation in the pitch tube as a separate pre-assembled constructional unit, as a result of which the installation of the pitch tube in the transmission is simplified and cost-effective. For example, a multi-part connecting element which is intended to provide electrical insulation within the transmission at a location usually accessible only with difficulty can be avoided. The pitch tube can thus be installed highly reliably and rapidly in a drive train of the wind turbine, which is advantageous in particular in a wind turbine provided for offshore use, since installation and maintenance times are very greatly dependent on suitable weather conditions and therefore frequently only short time windows are available. In addition, the electrical insulation within the pitch tube can be provided at a much earlier location in the current-carrying path between the generator and transmission compared to a connecting element engaging on the pitch tube and the transmission. This makes it even possible to already provide electrical insulation between the generator and the transmission outside a transmission housing of the transmission, so that no electrical voltages and/or currents at all can enter the interior of the transmission within the transmission housing. With the aid of the non-conductive material of the tube body, the pitch tube itself is designed to be electrically insulating, and therefore an electrically operationally reliable passage of the pitch tube through the transmission of the wind turbine is made possible cost-effectively and simply.

Since the non-conductive material is provided only in an axial partial region, producing the entire pitch tube from the non-conductive material is avoided. This makes it possible to use the generally more cost-intensive non-conductive material only very sparingly compared to the materials which are usually used for the pitch tube, but which are electrically conductive. In particular, it is sufficient to provide only as much non-conductive material for the electrically insulating axial partial region as is specifically required for the electrical insulation, as a result of the non-conductive material acting as a dielectric between electrically conductive other regions. The majority of the tube body of the pitch tube can be made of a cost-effective electrically conductive material. The production costs can thus be kept low.

The pitch tube has an axial extent sufficient to bridge a distance between the generator and the wind-driven rotor in a wind turbine. Preferably, the pitch tube can penetrate not only the transmission, but also the generator over the full axial extent. The associated wind turbine can be configured for industrial power generation and is generally dimensioned, in particular, for a nominal output of at least 2 MW, preferably at least 5 MW, and particularly preferably at least 15 MW, and is designed in particular for offshore operation, which implies corresponding proportions for the components of the wind turbine and the pitch tube and also the tube body of the pitch tube. In this case, the transmission, which can preferably have two or more planetary stages connected consecutively in the axial direction, is provided in the axial direction between the generator and the wind-driven rotor. The pitch tube can penetrate this transmission and therefore has a greater axial extent than a transmission housing of the transmission provided for the wind turbine. At the same time, the pitch tube, which is configured in particular in the manner of a hollow shaft, has a sufficiently large opening cross section to enable accommodation of the electrical and/or hydraulic supply lines from the generator to the rotor, which supply lines are provided for the operation of the blade pitch control and in particular can provide a power supply or a hydraulic actuating force and/or can transmit sensor signals. The pitch tube here in the radial direction has a wall thickness at which the dead weight of the pitch tube and the electrical and/or hydraulic supply lines can be tolerated. The maximum outside diameter of the pitch tube within the transmission is preferably selected to be as small as possible in order not to unnecessarily block construction space within the transmission. A pitch tube provided for a wind turbine usually has a length L of $2.0 \text{ m} \leq L \leq 6.0 \text{ m}$, in particular $2.5 \text{ m} \leq L \leq 5.0 \text{ m}$, preferably $3.0 \text{ m} \leq L \leq 4.5 \text{ m}$. A pitch tube provided for a wind turbine usually has an outside diameter D of $12 \text{ cm} \leq D \leq 50 \text{ cm}$, in particular $14 \text{ cm} \leq D \leq 30 \text{ cm}$, preferably $15 \text{ cm} \leq D \leq 20 \text{ cm}$. A pitch tube provided for a wind turbine usually has an inside diameter d of $10 \text{ cm} \leq d \leq 45 \text{ cm}$, in particular $12 \text{ cm} \leq d \leq 26 \text{ cm}$, preferably $13 \text{ cm} \leq d \leq 16 \text{ cm}$. In addition, the pitch tube at the first axial end and at the second axial end has a suitable coupling technique, in particular specially designed in this regard, for coupling the pitch tube to the generator or to the rotor.

The multi-part tube body of the pitch tube may, for example, have a plurality of tube pieces which are formed separately from one another and are each able by themselves to delimit a radially inner interior space for the electrical and/or hydraulic supply lines leading to the blade pitch control system and are able to be connected consecutively in the axial direction. Preferably, the electrical insulator is provided only in precisely one partial region of the axial extent of the tube body, and therefore the other partial regions of the axial extent of the tube body that differ from this partial region can be made essentially without any problems from an electrically conductive material, for example steel. The tube body may optionally be configured in two or multiple layers over its entire axial extent or only in at least one axial partial region in the radial direction. For example, an outer tube made of an electrical insulator may be attached outside an inner tube of the tube body, the inner tube being made of a conductive material. For example, a hose made of an electrical insulator may be shrunk onto a radially outwardly facing circumferential surface of the inner tube. In the mounted state, the first axial end of the tube body can face the generator and protrude from the transmission or out of the transmission housing of the transmission. In the mounted state, the second axial end of the tube body can face the wind-powered rotor and protrude from the transmission or out of the transmission housing of the transmission.

The non-conductive material for the axial region can be made of an electrically non-conductive material, for example a polymeric electrical insulator, for example a thermoplastic. In particular, the non-conductive material has an electrical conductivity of less than $10^{-8}$ S/cm or a specific resistance of more than $10^8$ Ωcm. As a result, currents and/or stray or leakage currents of the generator induced in the pitch tube by the generator cannot pass into the transmission and cause damage there. The non-conductive material may be made of a comparatively hard dielectric insulation material. This allows forces which occur to be absorbed via the non-conductive material. The non-conductive material can interrupt an electrical line within the tube body in the axial direction and/or in the radial direction, thereby blocking and/or shielding entry of electrical charges into the transmission.

The axial partial region of the multi-part tube body produced from the non-conductive material may be configured as a tube piece, which provides an electrically insulating effect in the axial and/or in the radial direction. For electrical insulation in the axial direction, the axial partial region produced from the non-conductive material can be attached in the axial direction to a tube piece made of an electrically conductive material, the axial partial region produced from the non-conductive material preferably being arranged axially between two tube pieces made of an electrically conductive material in order to electrically insulate the electrically conductive tube pieces from each other with the electrically non-conductive partial region as a dielectric. For electrical insulation in the radial direction, the axial partial region produced from the non-conductive material can be configured as a tube piece which can be attached to a tube piece of the pitch tube made differently from an electrically conductive material, in particular in order, as a dielectric, to provide electrical insulation with respect to a bearing and/or a seal. The tube piece which is made of the non-conductive material and provides the axial partial region produced from the non-conductive material can have a significant axial and/or radial extent in order to be able to absorb the occurring mechanical loads precisely in the way that the at least one other electrically conductive tube piece does. The axial partial region produced from the non-conductive material can thus not only be configured to be electrically insulating, but also load-dissipating.

In particular, the tube body has an insulating tube made of the non-conductive material and, radially outside the insulating tube, a sleeve which is made of a different material from the non-conductive material, in particular steel, for providing a bearing surface and/or a contacting or non-contacting sealing surface in relation to the transmission. Should the non-conductive material have an unfavorable material pairing with a transmission component movable relative thereto, a surface of the sleeve that is more suitable for bearing and/or sealing with the transmission component movable relative thereto can be provided. This can ensure that the non-conductive material provided for the electrical insulation does not interfere with a bearing and/or sealing of the pitch tube inside the transmission. For this purpose, a material thickness of the insulating tube can be suitably selected at least in the axial region taken up together with the sleeve in order to reliably prevent a voltage flashover to the sleeve.

Preferably, the tube body has an inner tube made of a different material from the non-conductive material, in particular steel, and, radially outside the inner tube, an insulating sleeve made of the non-conductive material for providing a bearing surface and/or a contacting or non-contacting sealing surface in relation to the transmission. Should the non-conductive material provide a sufficiently favorable material pairing with a transmission component movable relative thereto, the functions can provide electrical insulation and the function of providing a bearing and/or seal with the transmission component movable relative thereto can be combined in the insulating sleeve and thus brought together in a single component. This makes use of the finding that the narrowest point between the transmission component and the inner tube is usually formed in the region of a bearing and/or a seal, and thus, for sufficient electrical insulation, it can already be sufficient to provide the electrically insulating non-conductive material together with the insulating sleeve, designed for this purpose, only in the partial region in which a bearing and/or seal of the pitch tube is/are provided in the transmission. Outside this partial region, a sufficiently large air gap can be made between the inner tube and the transmission components, the air gap bringing about sufficient electrical insulation even without the application of the non-conductive material. The material thickness of the non-conductive material of the insulating sleeve can be suitably selected in order to reliably prevent a voltage flashover between the inner tube and the transmission component through the insulating sleeve. In addition, the axial extent of the non-conductive material of the insulating sleeve can be suitably selected to reliably prevent a voltage flashover between the inner tube and the transmission component axially past the insulating sleeve.

It is possible to provide different electrical insulation concepts in different axial partial regions. For example, the sleeve or the insulating sleeve can be provided at different bearing points between the pitch tube and the transmission and/or at different sealing points between the pitch tube and the transmission, in particular depending on the prevailing boundary conditions. In particular, an otherwise occurring current flow in the radial direction between the tube body and the transmission can be interrupted by means of the sleeve or the insulating sleeve.

Particularly preferably, the tube body has a/the insulating tube made of the non-conductive material and a/the inner tube made of a different material from the non-conductive material, in particular steel, wherein the insulating tube and the inner tube are connected to each other consecutively in the axial direction. The insulating tube can thereby interrupt an otherwise occurring current flow in the axial direction within the tube body such that, even with an inner tube provided in the direction of the wind-powered rotor, a current flow into the transmission cannot occur. Even in the event of metal/metal contact between the pitch tube and the transmission, the insulating tube provided closer to the generator can reliably prevent current from flowing into the transmission.

In particular, the insulating tube is provided in the axial direction between two inner tubes. This can minimize the amount of material in the non-conductive material, which can reduce manufacturing costs while providing sufficient electrical insulation. In particular, it is possible to couple the pitch tube to the generator and to couple the pitch tube to the wind-driven rotor by means of the, preferably metallic, inner tube and to provide the insulating tube spaced both from the first axial end of the tube body and from the second axial end of the tube body.

Preferably, the insulating tube and the inner tube are connected to each other via a flange connection so as to be fixed against movement. The flange connection can be brought about in particular via axially aligned connecting means, for example screws, which are easily accessible for a tool via an annular space formed between the pitch tube and the transmission. This simplifies the installation. In addition, a fixed connection between the insulating tube and the inner tube, in which connection no relative movement is possible, can easily be brought about.

Particularly preferably, the insulating tube and the inner tube are connected to each other so as to be axially secured. The axial securing forms captive-securing means acting in the axial direction, as a result of which disintegration of the tube body in the event of tensile forces acting in the axial direction can be reliably avoided. Particularly preferably, the axial securing means is designed to be releasable, and therefore disassembly for maintenance purposes is simplified.

In particular, the insulating tube and the inner tube are inserted into each other in an axial connection region. In this case, an axial part of the insulating tube can embrace an axial part of the inner tube radially outside or vice versa. In addition, an axial stop which limits the insertion depth in a defined manner and leads to a predefined axial extent of the tube body can be formed. In addition, the installation is simple and rapid.

Preferably, at least one axial securing element is provided for the axial securing, in particular a radially extending connecting means in the connection region and/or a securing ring and/or a groove nut outside the connection region. The axial securing element can block an axial relative movement of the insulating tube with respect to the inner tube in an axial direction or simultaneously in both axial directions and prevent an axial movement away. Axial disintegration of the parts inserted into each other can thus be avoided with a force fit and/or form fit. In addition or alternatively, the axial securing can be provided in a materially bonded manner, for example using an adhesive layer.

Particularly preferably, it is provided that a/the sleeve made of a different material from the non-conductive material, in particular steel, for providing a bearing surface and/or a contacting or non-contacting sealing surface in relation to the transmission and/or an/the insulating sleeve made of the non-conductive material for providing a bearing surface and/or a contacting or non-contacting sealing surface in relation to the transmission is/are provided in the connection region. The sleeve or insulating sleeve attached to the connection region can compress those parts of the insulating tube and the inner tube which lie one above another in the radial direction in the connection region and improve the assembly. The sleeve and/or the insulating sleeve can thereby additionally fulfill the function of connecting the insulating tube and the inner tube to each other with a form fit.

In particular, a clamping ring for pressing together the insulating tube with the inner tube so as to be fixed against movement is provided in the connection region. The clamping ring which is provided in the connection region and is designed, for example, in the manner of a hose clamp, can compress those parts of the insulating tube and the inner tube which lie one above another in the radial direction in the connection region and improve the assembly. Preferably, the clamping ring can be released again, and therefore disassembly of the tube body for maintenance purposes is simplified.

Preferably, the axial partial region produced from the non-conductive material is configured as a load-dissipating tube piece for the multi-part tube body. The tube piece which is made of the non-conductive material and provides the axial partial region produced from the non-conductive material can have a significant axial and/or radial extent in order to be able to absorb the occurring mechanical loads precisely in the way that the at least one other electrically conductive tube piece does. The axial partial region produced from the non-conductive material can thus not only be configured to be electrically insulating, but also load-dissipating.

Another aspect of the invention relates to a transmission for a wind turbine, wherein the transmission has a pitch tube which can be designed and developed as described above, wherein, in particular, the first axial end of the tube body, on a generator-side axial side of a transmission housing of the transmission, and/or the second axial end of the tube body, on a rotor-side axial side of the transmission housing facing away from the generator-side axial side, protrudes from the transmission housing. The transmission can be designed and developed in particular as described above. With the aid of the non-conductive material of the tube body, the pitch tube itself is designed to be electrically insulating, and therefore an electrically operationally reliable passage of the pitch tube through the transmission of the wind turbine is made possible cost-effectively and simply.

Preferably, the pitch tube is mounted and/or guided in the transmission and/or in the transmission housing so as to be rotatable relative thereto and axially displaceable relative thereto. This saves the need for a torsion-resistant fixing with a transmission component of the transmission. The pitch tube may, for example, be connected at the first axial end to part of the generator for rotation therewith, while the pitch tube is coupled at the second axial end to the rotor so as to be rotatable relative thereto. However, it is also possible that the pitch tube is connected at the second axial end to part of the rotor for rotation therewith, while the pitch tube is coupled at the first axial end to the generator so as to be rotatable relative thereto. In principle, it is also possible that the pitch tube is designed to be non-rotatable, in particular immovable. In particular, for the installation, an axial relative movement of the pitch tube relative to the transmission and/or relative to the transmission shaft can be permitted, wherein the pitch tube is positioned in an axially defined manner in the final installation position, in which the pitch tube which is fixed in the circumferential direction is coupled to the rotor of the wind turbine and the generator. For example, the pitch tube can be fastened to a generator housing of the generator for rotation therewith, thus obviating the need for a bearing relative to the rotor of the generator. By means of the non-rotatable pitch tube, cable routing within the pitch tube through the transmission is simplified and is particularly operationally reliable.

A further aspect of the invention relates to a drive train for a wind turbine with a rotor shaft which is connectable to a wind-driven rotor, a motor shaft of an electric machine which is operable in generator mode, a transmission which torque-transmittingly connects the rotor shaft to the motor shaft and can be designed and developed in particular as described above, for converting torque and rotational speed, and a pitch tube which penetrates the transmission in the axial direction and can be designed and developed as described above. The drive train can be designed and developed in particular as described above. With the aid of the non-conductive material of the tube body, the pitch tube itself is designed to be electrically insulating, and therefore an electrically operationally reliable passage of the pitch tube through the transmission of the wind turbine is made possible cost-effectively and simply.

A further aspect of the invention relates to a wind turbine for generating electrical energy from wind energy, with a rotor for providing torque from wind energy, a transmission which is coupled to the rotor and can be designed and developed in particular as described above, for converting the torque, and a generator for generating electrical energy from the torque introduced by the transmission, the rotor, the transmission and the generator being arranged coaxially to one another, and a pitch tube, which can be designed and developed as described above, leads from the generator through the transmission to the rotor. The wind turbine can be designed and developed in particular as described above. With the aid of the non-conductive material of the tube body, the pitch tube itself is designed to be electrically insulating, and therefore an electrically operationally reliable passage of the pitch tube through the transmission of the wind turbine is made possible cost-effectively and simply.

One aspect furthermore relates to a data agglomerate with data packets combined in a common file or distributed across different files for representing the three-dimensional design and/or the interactions of all of the constituent parts provided in the pitch tube, which can be designed and developed as described above, wherein the data packets are prepared, upon processing by a data processing device for operating a machine tool for the additive production of devices, to carry out additive production of the components of the pitch tube, in particular by 3D printing, and/or upon processing by a data processing device for carrying out a technical simulation, to carry out a simulation of the functioning of the pitch tube and thereby to output simulation results generated in the process for further use, in particular for the purpose of providing fatigue strength verification depending on variable loads and/or variable temperature loadings, and optionally to compare them with measurement data determined on a device produced in reality according to the invention and/or on a prototype of the device according to the invention. The data packets of the data agglomerate are specially adapted to the configuration according to the invention of the respective above-described device according to the invention in order to be able to adequately represent the interaction according to the invention of the constituent parts of the device according to the invention during processing in the data processing device. The data packets may be stored in particular in a spatially distributed manner, but may be adapted to one another in such a way that, in the case that all of the data packets are brought together in a common data processing device, the data agglomerate thus assembled provides all of the required data for additive manufacturing and/or a technical simulation with the aid of the data processing device for the device according to the invention. For example, the data packets are each separate parts of a data library, which are combined for the formation of the data agglomerate and are adapted to one another with respect to their dimensions relative to one another and/or absolute dimensions and/or material properties corresponding to the respective device according to the invention. The data agglomerate can represent a virtual embodiment of the respective device according to the invention in the manner of what is referred to as a "digital twin", which allows a virtual investigation in the form of a simulation or a real objectification by means of an additive manufacturing process. Such a digital twin is illustrated, for example, in US 2017/286572 A1, the disclosure contents of which are hereby referred to as part of the invention.

When the data processing device of the machine tool processes the data agglomerate, the device according to the invention is produced such that, after processing the data agglomerate in the data processing device, the device according to the invention is obtained, at least in the form of a prototype. In particular, a data packet can in each case represent a separately executed constituent part of the respective associated device according to the invention, and therefor the individual constituent parts can be easily actually and/or virtually assembled in their relative position and/or relative movability to realize the interactions that are essential to the invention. In particular, it is possible, with the aid of the respective data packets, to generate the different constituent parts of the resp active device separately and optionally from different materials by additive manufacturing and subsequently to assemble them to form a prototype of the respective device. The division of the data of the data agglomerate into different data packets thus makes possible in a simple manner a sequential additive manufacturing of constituent parts, which are movable relative to one another, of the device in question in the form of a kit of parts, which is prepared for the interaction according to the invention of the constituent parts of the prototype for solving the problem on which the invention is based to be assembled merely as expedient.

Additionally or alternatively, it is possible, using the data packets of the data agglomerate, in a virtual environment during a technical simulation, to calculate and/or predict the individual constituent parts of the respective device and their interactions, the physical state and/or the change of physical parameters depending on different boundary conditions and/or over the time of the associated device according to the invention and to continue to use them for checking whether the device according to the invention is suitable enough for the intended use on the basis of the hypothetical configuration and taking into account the hypothetical simulated influences. When the data agglomerate is processed by a data processing device representing the simulation environment, it is possible to be able to investigate the behavior of the device according to the invention, taking into account, in particular, changing, boundary conditions. This makes it possible, for example, to investigate centrifugal force effects on individual components of the device according to the invention depending on different static and/or dynamic loads and/or different operating temperatures, with it being possible for such simulation results to be incorporated into the creation of fatigue strength verification. Preferably, the simulation results obtained after the processing of the data agglomerate in the data processing device for the simulation environment are stored in order to compare them with measurement data determined on a device produced in reality according to the invention and/or on a prototype of the device according to the invention. This makes it possible to assess the quality of the simulation results obtained with the aid of the data agglomerate and/or, in particular in the case of particularly strong deviations, to identify measurement errors and/or an erroneous measurement. Non-destructive quality control of the device according to the invention is thus simplified and improved.

The data agglomerate enables cost-effective production of prototypes and/or computer-based simulations to study the functioning of the rotation body and/or the holding tool, identify problems in the specific application and find improvements. The solution to the problem on which the invention is based can be easily and cost-effectively checked using the data agglomerate.

BRIEF DESCRIPTION OF THE DRAWING

The invention is explained below by way of example with reference to the accompanying drawings using preferred exemplary embodiments, wherein the features presented below can each represent an aspect of the invention both individually and in combination. In the drawings:

FIG. 1: shows a schematic perspective view of a wind turbine,

FIG. 2: shows a schematic sectional view of part of the wind turbine from FIG. 1, FIG. 3: shows a schematic sectional view of a first embodiment of a pitch tube for the wind turbine from FIG. 1, FIG. 4: shows a schematic sectional view of a second embodiment of a pitch tube for the wind turbine from FIG. 1, FIG. 6: shows a schematic sectional view of a third embodiment of a pitch tube for the wind turbine from FIG. 1, and FIG. 6: shows a schematic sectional view of a fourth embodiment of a pitch tube for the wind turbine from FIG. 1.

DETAILED DESCRIPTION OF PREFERRED EMBODIMENTS

The wind turbine 10 shown in FIG. 1 can be used to generate electrical energy from wind power. For this purpose, the wind turbine 10 has a rotor 12, which, wind-powered by wind, can be rotated. The rotor 12 is coupled to a drive train 14. For this purpose, the rotor 12 is connected to a rotor shaft 16, which is coupled within the drive train 14 to a transmission 18 to convert the torque introduced via the rotor 12 and the rotor shaft 16. The torque converted in the transmission 18 is supplied via a motor shaft 19 to an electric machine which is operated in generator mode and can form a generator 20. The electrical energy generated by the electric machine can be supplied to a rechargeable battery and/or to a power grid. In the illustrated exemplary embodiment, the drive train 14 is completely accommodated in a nacelle 22, which is attached to an upper free end of a stationary tower 24. The rotor 12, the transmission 18 and the generator 20 can be arranged coaxially to one another and can preferably run at an angle to the horizontal.

As shown in FIG. 2, a pitch tube 26 can run through the generator 20 and the transmission 18 as far as the rotor 12 in order to be able to route electrical and/or hydraulic supply lines to a blade pitch control system of the rotor. The pitch tube 2 can be mounted and/or sealed here on the rotor shaft 16 and on the motor shaft 19 so as to be rotatable relative thereto. In one embodiment, an, in particular one-piece, tube body 28 can be completely made of a non-conductive material and can be supported and sealed via metallic sleeves 30 pressed on the tube body 28. In another embodiment, the, in particular one-piece, tube body 28 can be made of an electrically conductive material, for example steel, while, for the electrical insulation of the transmission 18 in relation to the tube body 28, insulating sleeves 32 made of a non-conductive material can be pressed on the tube body 28 and, in addition to the electrical insulation, can support a bearing and/or sealing of the pitch tube 26.

The rotor shaft 16 can be connected to a rotor 34 for rotation therewith, the rotor interacting electromagnetically with a stator 36 to form an electric machine of the generator 20. The generator 20 can be directly adjoined by a transmission housing 38 of the transmission 18, such that the material of the transmission housing 38 can also close an axial side of the generator 20 facing the transmission 18. The rotor shaft 19, which is connectable to the rotor 12, is an input shaft of the transmission 18, wherein in the illustrated exemplary embodiment, the transmission has a first planetary stage 40 and a second planetary stage 42 following in the axial direction.

As shown in FIG. 3, the tube body 28 of the pitch tube 26 can also be produced from multiple parts and as a composite of different materials. The tube body 28 can have a metallic inner tube 44 and an insulating tube 46 made of the non-conductive material, said tubes being arranged consecutively in the axial direction and being connected to each other. The insulating tube 46 provides an electrically insulating axial partial region of the tube body 28, which blocks the transmission of electrical voltages and currents induced in the generator 20. Here, for example, the inner tube 44 can be inserted into the insulating tube 46 or vice versa. In an axial connection region 48, in which, in the illustrated exemplary embodiment, part of the inner tube 44 and part of the insulating tube 46 are arranged consecutively in the radial direction, the metallic sleeve 30, which forms a bearing surface 60 and/or a sealing surface 52 on its radially outer casing surface, can be provided. The sleeve 30 can, for example, be axially secured by means of a securing ring 56 inserted in the insulating tube 46. Preferably, the inner tube 44 and the insulating tube 46 are captively connected to each other axially via a radially extending connecting means 54, in particular pin. In particular, the at least one connecting means 54 is covered radially on the outside by the sleeve 30. In the illustrated exemplary embodiment, the insulating tube 46 is provided on the axial side facing the generator 20, while the inner tube 44 is provided on the axial side facing the rotor 12, with the reverse arrangement also being possible. This even permits an electrically conductive path between the inner tube 44 and the sleeve 30 via the connecting means 54, since the axial extent of the insulating tube 46 is of a size sufficient to provide electrical insulation between the generator 20 and the sleeve 30. Direct contact of the sleeve 30 with the connecting means 54 contacting the inner tube 44 can therefore be permitted, as a result of which the production and installation are simplified. In particular, it is possible to replace the sleeve 30 by a clamping ring, so that, when the clamping ring is tightened, the clamping ring can drive the connecting means 54 inward in the radial direction into the inner tube 44 in order to pin the insulating tube 46 to the inner tube 44.

In the embodiment of the pitch tube 26 shown in FIG. 4, in comparison to the embodiment of the pitch tube 26 shown in FIG. 3, only a plug-in connection between the inner tube 44 and the insulating tube 46 is provided in the connection region 48. The connection between the inner tube 44 and the insulating tube 46 can be made with a force fit, for example by means of a press fit between the inner tube 44 and the insulating tube 46 in the connection region, and/or a material bond, for example by means of an adhesive layer between the inner tube 44 and the insulating tube 46 in the connection region, and/or a form fit, for example as a latching connection.

In the embodiment of the pitch tube 26 shown in FIG. 5, in comparison to the embodiment of the pitch tube 26 shown in FIG. 3, the insulating tube 46 is provided in the axial direction between two inner tubes 44 which are inserted mirror-inverted to each other. In this case, a common, in particular insulating, sleeve 30 can be provided for covering all the connecting means 54 or in each case a separate sleeve 30, which sleeves can be arranged directly consecutively in the axial direction. In the illustrated exemplary embodiment, the one sleeve 30 can form the bearing surface 50 and the other sleeve the sealing surface 52, such that, as a result, different surface qualities can be provided easily and cost-effectively, optimized for the respective purpose.

In the embodiment of the pitch tube 26 shown in FIG. 6, in comparison to the embodiment of the pitch tube 26 illustrated in FIG. 5, the insulating tube 46 is connected to the inner tubes 44 via flange connections 58. In this case, the various flange connections 58 are provided on different radii so that the material of the insulating tube 46 can provide sufficient electrical insulation between the fastening means of the respective flange connection 58.

What is claimed is:

1. A pitch tube for a blade pitch control system of a wind turbine, the pitch tube comprising a tube body extending from a first axial end to a second axial end, for passing supply lines through a transmission, said tube body designed of multiple parts and made of a non-conductive material only in an axial partial region in order to electrically insulate the first axial end in relation to the second axial end and/or in order to electrically insulate the tube body in relation to the transmission.

2. The pitch tube of claim 1, wherein the tube body comprises an insulating tube made of the non-conductive material, and a sleeve arranged radially outside the insulating tube and made of a material which is different than the non-conductive material, for providing a bearing surface and/or a contacting or non-contacting sealing surface in relation to the transmission.

3. The pitch tube of claim 2, wherein the material of the sleeve is steel.

4. The pitch tube of claim 1, wherein the tube body comprises an inner tube made of a material which is different than the non-conductive material, and an insulating sleeve arranged radially outside the inner tube and made of the non-conductive material, for providing a bearing surface and/or a contacting or non-contacting sealing surface in relation to the transmission.

5. The pitch tube of claim 4, wherein the inner tube made is made of steel.

6. The pitch tube of claim 1, wherein the tube body comprises an insulating tube made of the non-conductive material, and an inner tube made of a material which is different than the non-conductive material, wherein the insulating tube and the inner tube are connected to each other consecutively in an axial direction.

7. The pitch tube of claim 6, wherein the tube body comprises two of said inner tube, with the insulating tube arranged in the axial direction between the two inner tubes.

8. The pitch tube of claim 6, further comprising a flange connection designed to connect the insulating tube and the inner tube to each other so as to be fixed against movement.

9. The pitch tube of claim 6, wherein the insulating tube and the inner tube are connected to each other so as to be axially secured.

10. The pitch tube of claim 6, wherein the insulating tube is made of steel.

11. The pitch tube of claim 6, wherein the insulating tube and the inner tube are inserted into each other in an axial connection region.

12. The pitch tube of claim 11, further comprising an axial securing element designed to secure the insulating tube and the inner tube in the axial direction, said axial securing element being a radially extending connector and/or a securing ring and/or a groove nut outside the connection region.

13. The pitch tube of claim 12, wherein the radially extending connector is in the connection region.

14. The pitch tube of claim 11, further comprising a sleeve arranged in the connection region and made of a material which is different from the non-conductive material for providing a bearing surface and/or a contacting or non-contacting sealing surface in relation to the transmission, and/or the pitch tube further comprising an insulating sleeve arranged in the connection region and made of the non-conductive material for providing a bearing surface and/or a contacting or non-contacting sealing surface in relation to the transmission.

15. The pitch tube of claim 14, wherein the sleeve is made of steel.

16. The pitch tube of claim 11, further comprising a clamping ring arranged in the connection region and designed to press together the insulating tube with the inner tube so as to be fixed against movement.

17. The pitch tube of claim 1, wherein the axial partial region produced from the non-conductive material is designed as a load-dissipating tube piece for the multi-part tube body.

18. A transmission for a wind turbine, the transmission comprising a pitch tube which comprises a tube body extending from a first axial end to a second axial end, for passage of supply lines through the transmission, said tube body designed of multiple parts and made of a non-conductive material only in an axial partial region in order to electrically insulate the first axial end in relation to the second axial end and/or in order to electrically insulate the tube body, the transmission further comprising a transmission housing, wherein the first axial end of the tube body on a generator-side axial side of the transmission housing protrudes from the transmission housing and/or the second axial end of the tube body on a rotor-side axial side of the transmission housing facing away from the generator-side axial side protrudes from the transmission housing.

19. The transmission of claim 18, wherein the pitch tube is mounted and/or guided in the transmission so as to be relatively rotatable and relatively axially displaceable.

* * * * *